United States Patent
John et al.

(10) Patent No.: US 9,443,206 B2
(45) Date of Patent: Sep. 13, 2016

(54) RECONCILING ADDRESSES

(75) Inventors: Josy John, Wesley Chapel, FL (US);
Sutap Chatterjee, Tampa, FL (US)

(73) Assignee: Verizon Patent and Licensing Inc.,
Basking Ridge, NJ (US)

(*) Notice: Subject to any disclaimer, the term of this patent is extended or adjusted under 35 U.S.C. 154(b) by 1093 days.

(21) Appl. No.: 12/729,553

(22) Filed: Mar. 23, 2010

(65) Prior Publication Data

US 2011/0238619 A1    Sep. 29, 2011

(51) Int. Cl.
*G06F 17/30*    (2006.01)
*G06Q 10/00*    (2012.01)

(52) U.S. Cl.
CPC .................................... *G06Q 10/00* (2013.01)

(58) Field of Classification Search
None
See application file for complete search history.

(56) References Cited

U.S. PATENT DOCUMENTS

| | | | |
|---|---|---|---|
| 7,590,663 B2* | 9/2009 | Hamer | |
| 7,912,842 B1* | 3/2011 | Bayliss | 707/749 |
| 2002/0035504 A1* | 3/2002 | Dver et al. | 705/10 |
| 2004/0044673 A1* | 3/2004 | Brady et al. | 707/100 |
| 2004/0052343 A1* | 3/2004 | Glaser et al. | 379/88.22 |
| 2005/0198085 A1* | 9/2005 | Blakey et al. | 707/204 |
| 2005/0246363 A1* | 11/2005 | Paussa | 707/101 |
| 2007/0192122 A1* | 8/2007 | Routson et al. | 705/1 |
| 2009/0313309 A1* | 12/2009 | Becker et al. | 707/203 |
| 2010/0318499 A1* | 12/2010 | Arasu et al. | 707/693 |
| 2011/0040745 A1* | 2/2011 | Zaydman et al. | 707/714 |

* cited by examiner

*Primary Examiner* — Charles Adams

(57) ABSTRACT

A device may include a memory, line cards, and a processor. The memory may include an address database for storing sub-location addresses. The line cards may be configured to communicate with other devices. The processor may be configured to receive a request to reconcile physical addresses from a network device, retrieve sub-location addresses from the database based on the request, determine whether each of the sub-location addresses can be deleted from the database based on association between the sub-location address and a physical device, and, for each of the sub-location addresses, delete the sub-location address from the database based on the determination.

19 Claims, 10 Drawing Sheets

RECONCILING ADDRESSES

BACKGROUND INFORMATION

An order provisioning system may perform many tasks. For example, an order provisioning system may provide a price list or product description, accept orders from customers, and process orders. In accepting and processing orders, the system may enter customer addresses into one or more working databases.

DETAILED DESCRIPTION OF PREFERRED EMBODIMENTS

The following detailed description refers to the accompanying drawings. The same reference numbers in different drawings may identify the same or similar elements.

Figure 1:
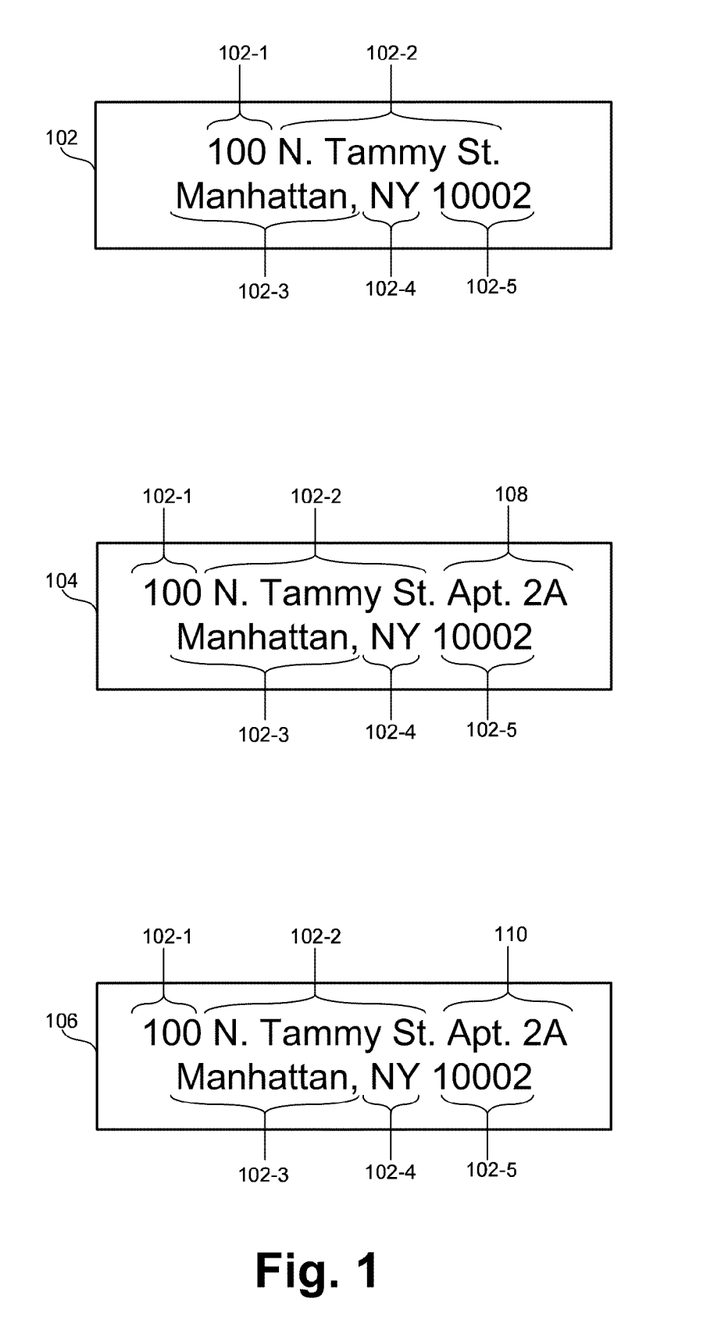
FIG. 1 shows an exemplary basic address and an exemplary sub-location address.

In the following description, a system may identify and correct address discrepancies. Within an address database, a type of addresses, "sub-location addresses," that designate the same location, may create an address discrepancy. FIG. 1 shows an exemplary basic address 102 and exemplary sub-location addresses 104 and 106. As shown, basic address 102 may include a house number 102-1, street name 102-2, community name 102-3, state name 102-4, and/or zip code 102-5. Each of house number 102-1, street name 102-2, community name 102-3, state name 102-4, and/or zip code 102-5 may correspond to a component of the United States Postal Service (USPS) address.

Sub-location address 104 may include, in addition to components 102-1 through 102-5, a supplemental address 108. Supplemental address 108 may include one or more identifiers (e.g., abbreviations, numbers, etc.) that designate a location (e.g., an apartment, apartment number, suite, etc.) within or associated with an area designated by the corresponding basic address 102. Similarly, sub-location address 106 may include, in addition to components 102-1 through 102-5, a supplemental address 110 that is different from supplemental address 108.

During the lifetime of the address database, an operator, user, or a system may create sub-location addresses 104 and 106 that designate the same location. For example, an operator may have inadvertently created sub-location address 106 with Apt A2 110, although the operator meant supplemental address Apt. 2A 108 to be the same thing as supplemental address Apt A2 110. This may have been due to the fact that there is no standard. For example, assume there was a standard for an address specifying apartment numbering: a number is to be followed by alphabetic characters. If there was such a standard, address 106 might not have been created.

Once created, one or both of addresses 104 and address 106 may be associated with an account, causing confusion and errors. To prevent such instances, the system may identify and remove redundant or inconsistent sub-location addresses. In addition, the system may aid in preventing future inconsistencies or discrepancies by enforcing standards for creating sub-location addresses.

Figure 2:
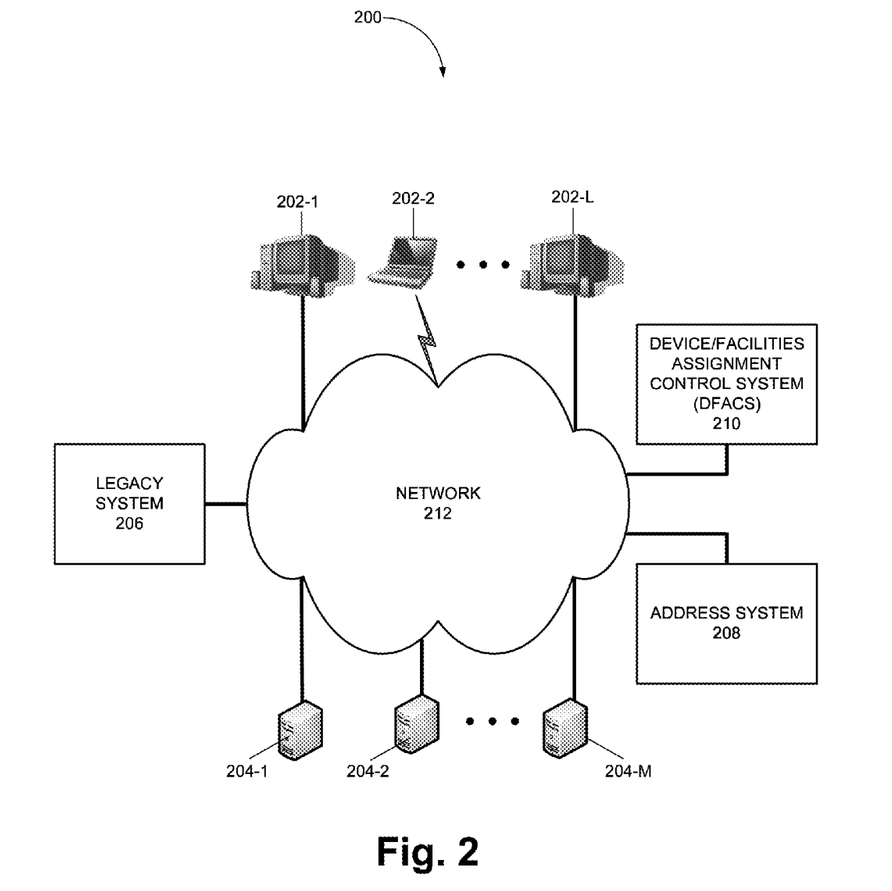
FIG. 2 shows an exemplary network in which the concepts described herein may be implemented.

FIG. 2 shows an exemplary network 200 in which the concepts described herein may be implemented. As shown, network 200 may include client devices 202-1 through 202-L (collectively "client devices 202" and individually "client device 202-x"), provisioning platforms 204-1 through 204-M (collectively "provisioning platforms 204" and individually "provisioning platform 204-x"), a legacy order entry system 206, an address system 208, a device/facilities assignment control system (DFACS), and network 212.

Network 200 is illustrated for the purpose of simplicity and ease of understanding. Consequently, network 200 does not show other network components, such as routers, switches, etc. In addition, depending on the implementation, network 200 may include fewer, additional, or different devices than those illustrated in FIG. 2. For example, in one implementation, network 200 may not include legacy system 206.

Each of client devices 202 may include a client application for placing an order or determining the status of an order at one of provisioning platforms 204. Depending on the implementation, via the client application, a user may place an order for tangible or intangible goods/services (e.g., a manufactured product, a widget, a service, etc.). For example, in some implementations, a user may place an order for a telephone number to be assigned to the user or to an address.

Provisioning platforms 204 may include one or more server applications for receiving orders from client devices 202. In one implementation, provisioning platforms 204 may receive addresses that are part of the orders from client devices 202. In addition, provisioning platforms 204 may send the received addresses to address system 208 to be stored and processed.

Legacy system 206 may include a device for submitting orders to provisioning platforms 204 via legacy hardware and software. For example, assume that one of provisioning platforms 204 includes an inventory of telephone numbers. In such instances, legacy system 206 may request provisioning platform 204-x to assign a telephone number to a plain old telephone system (POTS) customer via a legacy application/interface.

Address system 208 may include basic addresses and sub-location addresses in an address database. In addition, address system 208 may identify and remove redundant or inconsistent sub-location addresses from the address database, and prevent future address inconsistencies or discrepancies by enforcing sub-location address creation standards. In removing an address from the database, address system 208 may consult another system, such as DFACS 210.

DFACS 210 may include records that track devices, equipment, or facilities that are assigned to different addresses. Furthermore, based on the records, DFACS 210 may determine whether an address may be removed from address system 208. For example assume that a record in DFACS 210 indicates that a telephone line extends from a known wire center (e.g., a central office) to a location identified by a particular address. In addition, assume that DFACS 210 receives, from address system 208, a request to determine whether the particular address may be removed from a database in address system 208. In such a case, DFACS 210 may reply to address system 208 that the address may not be deleted, as it is associated with a telephone line.

Network 212 may include a fiber-optics network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks.

Devices (e.g., client devices 202, provisioning platforms 204, etc.) that are shown in FIG. 2 may connect to network 212 via wireless or wired communication links. In addition, network 212 may allow any of devices 202, platforms 204, and systems 206-210 to communicate with any other device 202, platform 204, and system 206, 208 or 210. In some embodiments, devices 202, platforms 204, and systems 206-210 may communicate dirctly with each other rather than through network 212.

Figure 3:
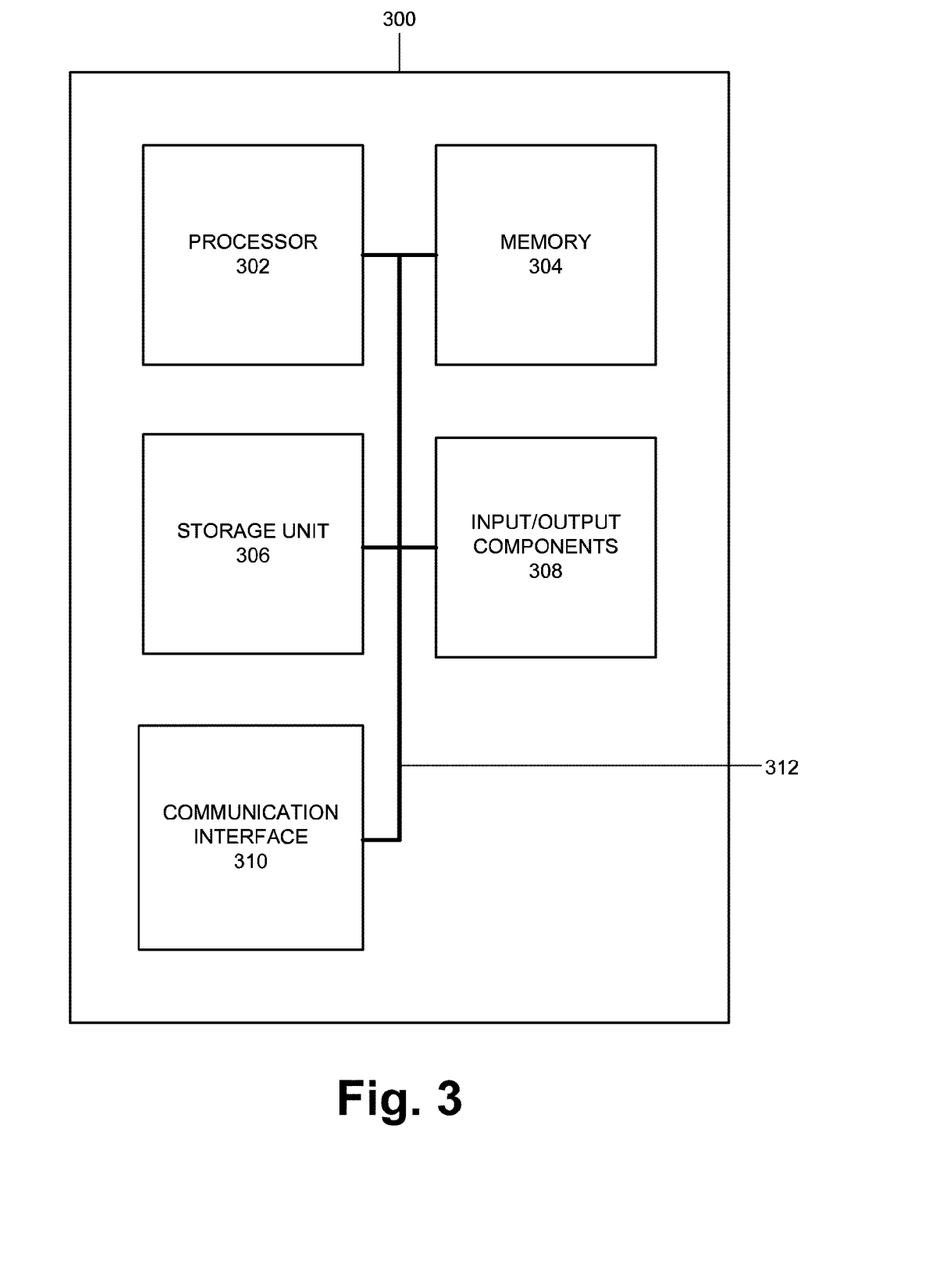
FIG. 3 is a block diagram of exemplary components of a network device of FIG. 2.

FIG. 3 is a block diagram of exemplary components of a network device 300. Network device 300 may represent client device 202 or a device in provisioning platform 204, legacy system 206, address system 208, or DFACS 210. As shown, network device 300 may include a processor 302, memory 304, storage unit 306, input/output components 308, communication interface 310, and bus 312. Depending on the implementation, network device 300 may include additional, fewer, or different components. For example, network device 300 may include one or more power supplies, fans, motherboards, video cards, display screens, etc.

Processor 302 may include one or more processors, microprocessors, application specific integrated circuits (ASICs), field programmable gate arrays (FPGAs), or other processing logic that may interpret and execute instructions.

Memory 304 may include static memory, such as read only memory (ROM), and/or dynamic memory, such as random access memory (RAM), or onboard cache, for storing data and machine-readable instructions, such as computer-executable instructions. Storage unit 306 may include a magnetic and/or optical storage/recording medium, such as computer-readable media. In some implementations, storage unit 306 may be mounted under a direct tree or mapped to a drive.

Input/output components 308 may include a display (e.g., a cathode ray tube, a liquid crystal display (LCD), an organic light emitting diode (OLED) display, etc.), a keyboard, a mouse, a speaker, a microphone, a Digital Video Disk (DVD) writer, a DVD reader, Universal Serial Bus (USB) ports, and/or other types of components for converting physical events or phenomena to and/or from digital signals that pertain to network device 300.

Communication interface 310 may include any transceiver-like mechanism that enables network device 300 to communicate with other devices and/or systems. For example, communication interface 310 may include mechanisms for communicating via a network, such as a wireless network. In these implementations, communication interface 310 may include one or more radio frequency (RF) transmitters, receivers and/or transceivers and one or more antennas for transmitting and receiving RF data. For example, communication interface 310 may include a radio or television tuner, a mobile telephone transceiver, etc. Communication interface 310 may also include a modem or an Ethernet interface to a LAN or other network for communicating with other devices. Bus 312 may provide an interface through which components of network device 300 can communicate with one another.

Figure 4:
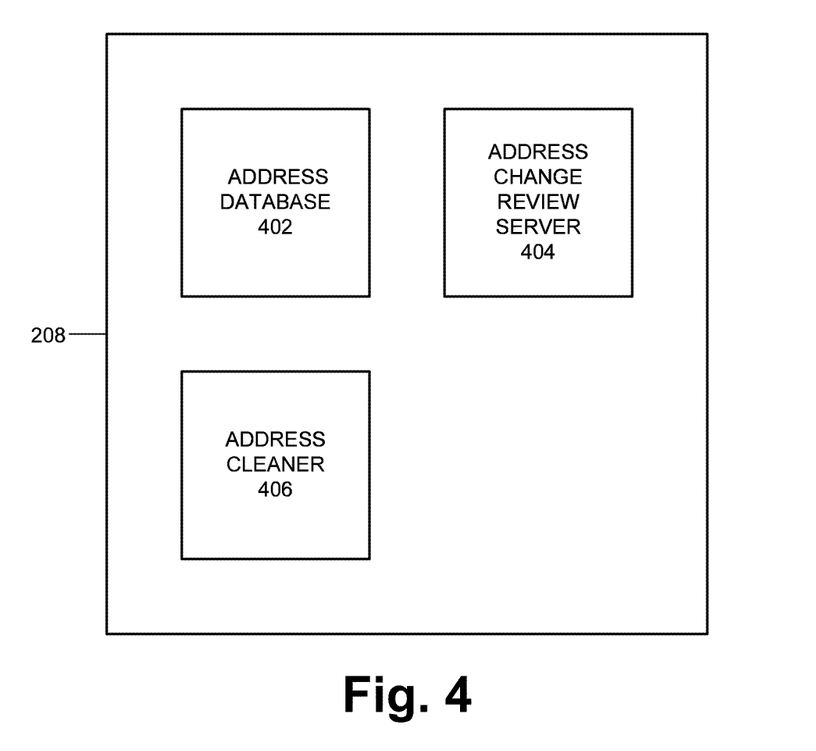
FIG. 4 is a block diagram of functional components of an exemplary address system of FIG. 2.

FIG. 4 is a block diagram of exemplary functional components of address system 208. As shown, address system 208 may include an address database 402, address change review server 404, and an address cleaner 406. Depending on the implementation, address system 208 may include additional, fewer, or different components than those illustrated in FIG. 4. For example, address system 208 may include an operating system, applications, etc. In another implementation, address system 208 may be distributed over multiple network devices. In yet another implementation, functionalities of address change review server 404 may be integrated in address cleaner 406.

Address database 402 may include records of both basic addresses and sub-location addresses. In some implementations, address database 402 may also include additional information, such as lookup information for user accounts, user telephone numbers, etc.

Address change review server 404 may provide, to a client (e.g., a browser) on client device 202-*x*, provisioning platform 204-*x*, or another type of device, a list of failed address changes that require an operator/user intervention. Upon the operator or user intervention, address changes may be committed to address database 402.

Address cleaner 406 may correct address discrepancies when an operator, user, thread, or program initiates a sub-location address removal/cleanup. In correcting the discrepancies, address cleaner 406 may initially determine whether a sub-location address is associated with a user account with transaction history (e.g., one or more transactions for the account). If there is no association, address cleaner 406 may remove/delete the sub-location address from address database 402, pending an approval from DFACS 210. If the address is associated with a user account, address cleaner 406 may attempt to reassign the user account to a corresponding basic address before removing or deleting the address from address database 402.

In addition to correcting address discrepancies, address cleaner 406 may receive and enforce sub-location address standards. For example, an operator or a user may specify, via a client interface, allowable sub-location address formats. Based on the specified formats, address cleaner 406 may allow or deny a sub-location address creation.

Depending on the implementation, address database 402, address change review server 404, and/or address cleaner 406 may be implemented via an application server, via a web server, etc.

In some implementations, address system 208 may maintain address database 402 for telephone systems (e.g., records that associate telephone numbers with users and/or addresses). In such implementations, address system 208 may process (e.g., remove or delete) sub-location addresses on wire center-by-wire center basis. As used here, the term "wire center" may refer to a location (e.g, a central office) at which telephone lines associated with addresses/user accounts are interconnected and/or switched.

Figure 5:
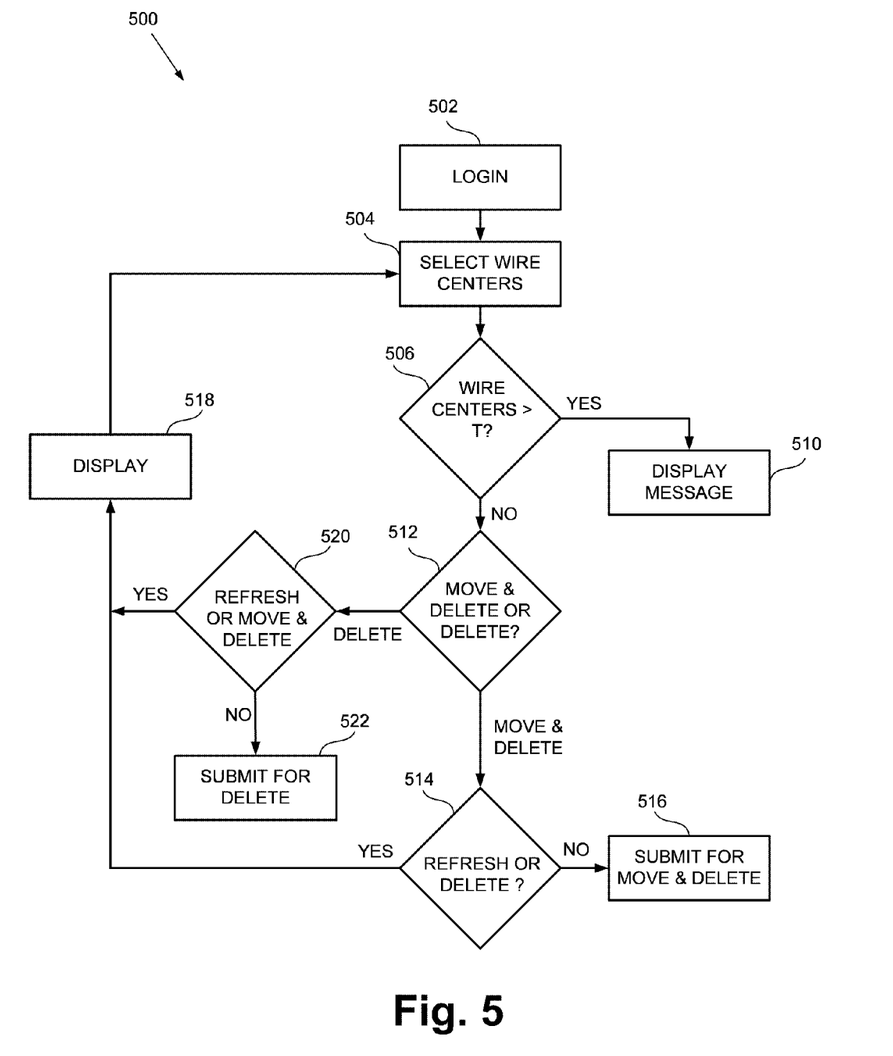
FIG. 5 is a flow diagram of an exemplary process for specifying wire centers for sub-location address removal/cleanup.

FIG. 5 is a flow diagram of an exemplary process 500 for specifying one or more wire centers for sub-location address removal/cleanup. In this implementation, assume that an operator has the privilege to delete addresses that are associated with one or more wire centers and/or to reassign a user or user account to different addresses.

Process 500 may begin with the operator being authenticated at address cleaner 406 via a client (e.g., a client graphical user interface (GUI), web browser, etc.). For example, the operator at provisioning platform 204-1 or another device, may login to address cleaner 406, by providing a user id and a password.

Address cleaner 406 may select one or more wire centers based on operator input (block 504). For example, the operator may specify a wire center via a browser, and the browser may send the selection to address cleaner 406 over network 212, to schedule the selected wire center for reconciling addresses associated with telephone lines administered at the wire center.

Address cleaner 406 may determine whether the number of scheduled wire centers, including the selected wire centers, is greater than a threshold T (block 506). In one implementation, the threshold T (e.g., 3, 4, etc.) may be set based on how much effect scheduled address reconciliations may have on wire center operation (e.g., downtime). If the number of scheduled wire centers is greater than T (block 506—YES), address cleaner 406 may indicate, via the browser, to the operator that a limit on the number of wire centers (e.g., daily limit, weekly limit, hourly limit, etc., per catalog (e.g., a single database for administering telephone numbers in multiple regions)) that can be scheduled for reconciling addresses has been reached (block 510).

If the number of scheduled wire centers is not greater than T (block 506—NO), address cleaner 406 may determine whether reconciling addresses for the selected wire centers involves "move and delete" (e.g., reassigning user accounts, users, and/or telephone numbers from sub-location addresses to the corresponding basic addresses and deleting the sub-location addresses from address database 402) or simply "delete" (e.g., deleting the sub-location addresses from address database 402) (block 512).

If reconciling addresses involves "move and delete" (block 512—MOVE AND DELETE), address cleaner 406 may determine whether one or more of the selected wire centers already have been selected and/or scheduled for "delete" or "refresh" (e.g., a type of address synchronization procedure) (block 514). If one or more of the wire centers have not already been selected for "delete" or "refresh" (block 514—NO), address cleaner 406 may submit or schedule the selected wire centers for "move and delete" (block 516). Otherwise (block 514—YES), address cleaner 406 may display to the operator information to change the selection of wire center(s) (block 518). At block 518, address cleaner 406 may return to block 504.

If reconciling addresses involves "delete" (block 512—DELETE), address cleaner 406 may determine whether one or more of the selected wire centers already have been selected and/or scheduled for "move and delete" or "refresh" (block 520). If one or more of the wire centers have not already been selected for "move and delete" or "refresh" (block 520—NO), address cleaner 406 may submit or schedule the selected wire centers for "delete" (block 522). Otherwise (block 520—YES), address cleaner 406 may display to the operator/user, via a browser or client application, information to change the selection of wire center(s) (block 518).

Figure 6:
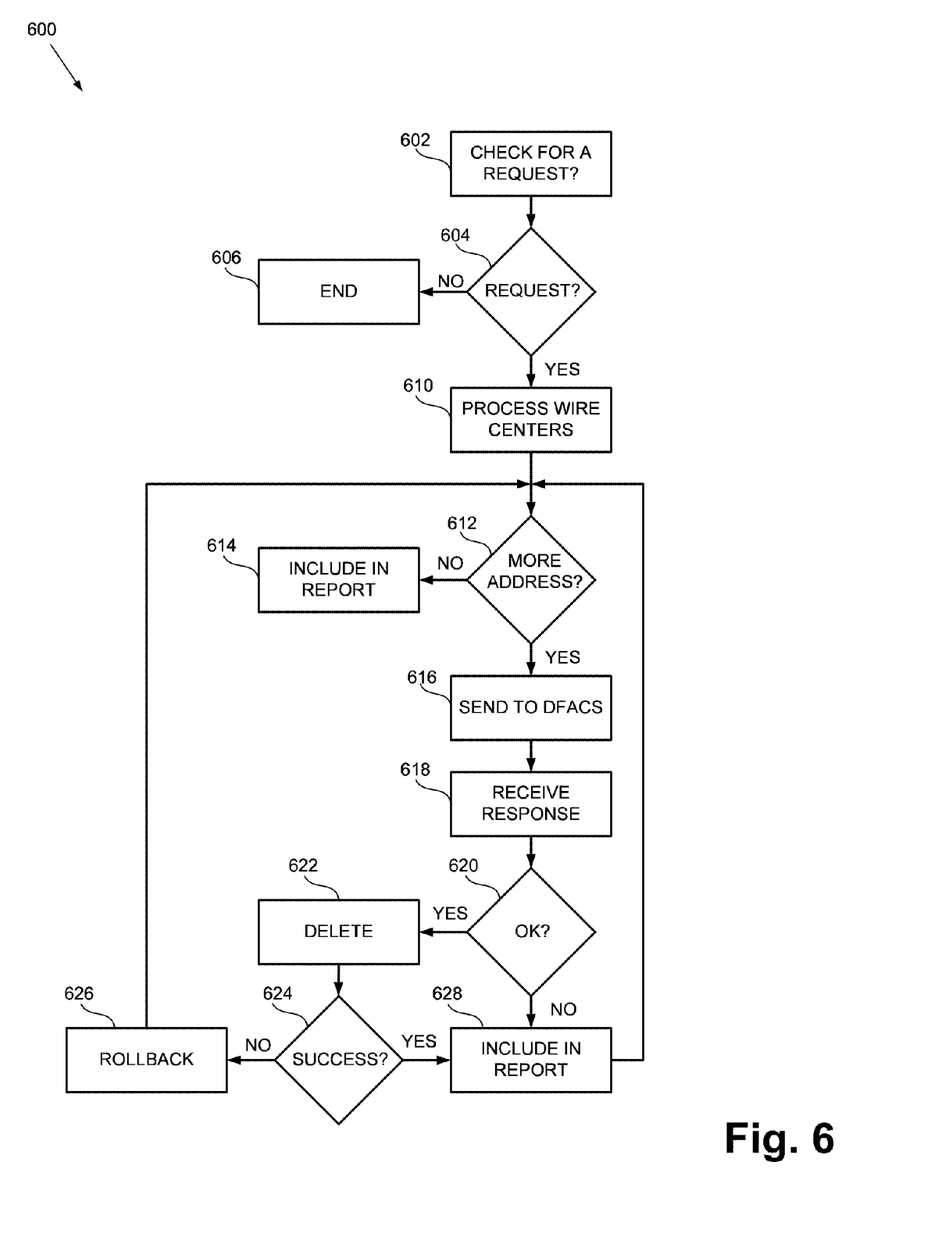
FIG. 6 is a flow diagram of an exemplary process for deleting sub-location addresses without account history.

FIG. 6 is a flow diagram of an exemplary process 600 for deleting sub-location addresses (see block 522). Assume that addresses in process 600 are sub-location addresses; that there is no pending transaction for the addresses; that there is no home owners association id, property id, and/or video contract id for the addresses; that each of the addresses has no account history; that the addresses have not been created recently; that the addresses do not conform to a standard; and that there is no fiber-to-the-premises (FTTP) capability for the addresses.

Process 600 may start with address cleaner 406 checking for a request to delete sub-location addresses (block 602). This may occur, for example, when a thread associated with process 500 submits a request to delete addresses that are associated with a particular wire center (see block 522).

If there is no request to delete the sub-location addresses (block 604—NO), address cleaner 406 may terminate process 600 (block 606). In many implementations, address cleaner 406 may periodically start or restart process 600 thereafter.

If there is a request to delete the sub-location addresses (block 604—YES), address cleaner 406 may process the scheduled wire centers (see block 522) for address reconciliation (block 610). Processing the scheduled wire centers, for example, may include obtaining a list of the sub-location addresses for the wire centers.

At block 612, if there is no sub-location address to process in the list (block 612—NO), address cleaner 406 may include, in a report, a summary of address reconciliation (block 614). The summary may include, for example, a list of sub-location addresses that have not been deleted from address database 402 due to system errors, sub-location addresses that have been successfully deleted, etc. If there is a sub-location address to process in the list (block 612—YES), address cleaner 406 may send a message to DFACS 210, requesting DFACS 210 to determine whether the sub-location address may be removed from address database 402. At block 618, address cleaner 406 may receive, from DFACS 210, a reply to the message.

If the reply indicates that DFACS 210 has disapproved the deletion (block 620—NO), address cleaner 406 may insert the sub-location address in a report, indicating that the address was not deleted (block 628). From block 628, process may proceed to block 612. If the reply indicates that DFACS 210 has approved the deletion (block 620—YES), address cleaner 406 may delete the sub-location address from address database 402 (block 622), and proceed to block 624.

At block 624, address cleaner 406 may determine whether the sub-location address has been successfully deleted from address database 402. If the deletion is successful (block 624—YES), address cleaner 406 may insert the sub-location address in the report (block 628) and proceed to block 612 to process the next address in the list. Otherwise (block 624—NO), address cleaner 406 may rollback the sub-location deletion. In rolling back the deletion, address cleaner 406 may undo any operations that were performed in preparation of the deletion (e.g., undo changes in address database 402). At block 626, address cleaner 406 may proceed to block 612.

Figure 7:
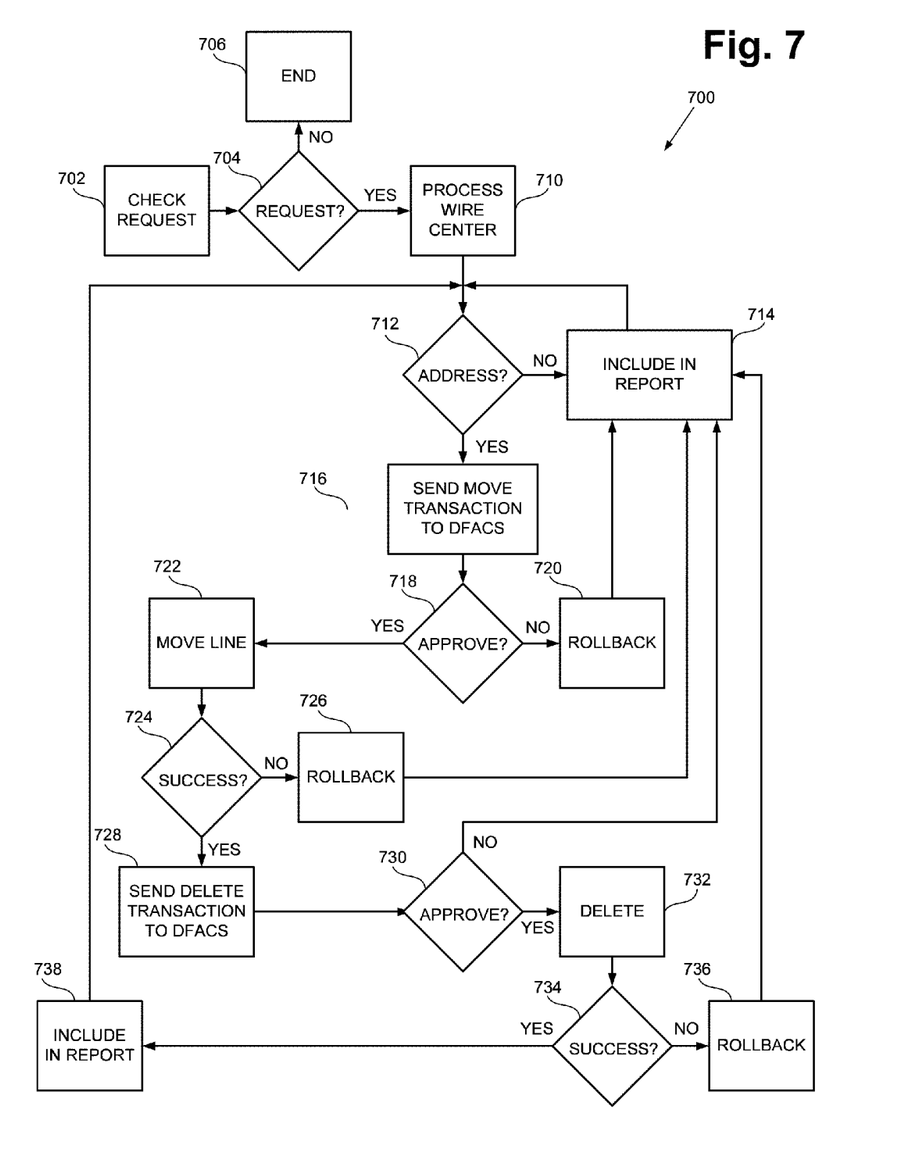
FIG. 7 is a flow diagram of an exemplary process for moving accounts between addresses and deleting sub-location addresses.

FIG. 7 is a flow diagram of an exemplary process 700 for "moving and deleting" sub-location addresses (see block 516). Assume that addresses in process 700 are sub-location addresses with corresponding basic addresses; that there is no pending transaction for the sub-location addresses and the basic addresses; that there is no home owners association id, property id, and/or video contract id for the sub-location addresses; that each of the sub-location addresses has account history and each of the corresponding basic addresses does not have account history; that the sub-location addresses have not been created recently; that the sub-location addresses do not conform to a standard; and that there is no fiber-to-the-premises (FTTP) capability for the sub-location addresses.

Process 700 may start with address cleaner 406 checking for a request to move and delete sub-location addresses (block 702). This may occur, for example, when a thread or process associated with process 500 submits a request to move and delete addresses that are associated with a particular wire center (see block 516).

If there is no request to move and delete the sub-location addresses (block 704—NO), address cleaner 406 may terminate process 700 (block 706). In many implementations, address cleaner 406 may periodically start or restart process 700 thereafter.

If there is a request to delete the sub-location addresses (block 704—YES), address cleaner 406 may process the scheduled wire centers (see block 516) for address reconciliation (block 710). Processing the scheduled wire centers, for example, may include obtaining a list of the sub-location addresses associated with each of the wire centers.

At block 712, if there is no sub-location address to process in the list (block 712—NO), address cleaner 406 may include, in a report, a summary of its address reconciliation (block 714). The summary may include, for example, a list of sub-location addresses that have not been deleted from address database 402 due to system errors, sub-location addresses that have been successfully deleted, etc. If there is a sub-location address to process in the list (block 712—YES), address cleaner 406 may send a message to DFACS 210, requesting DFACS 210 to reassign or to approve reassigning a telephone line or a device associated with the sub-location address to the corresponding basic address (block 716). If a reply from DFACS 210 indicates that the line/device has not been successfully reassigned or reassigning the line/device has not been approved by DFACS 210 (block 718—NO), address cleaner 406 may rollback the move-and-delete transaction (block 720). In addition, address cleaner 406 may include a summary of the rollback in the report (block 714).

If the address has been successfully reassigned or reassigning the address has been approved by DFACS 210 (block 718—YES), address cleaner 406 may attempt to re-associate the user account for the sub-location address with the corresponding basic address in address database 402 (block 722). Furthermore, if the re-assignment (or the move) is a failure (block 724—NO), address cleaner 406 may rollback the move-and-delete transaction (block 726) and proceed to block 714.

If the reassignment is a success (block 724—YES), address cleaner 406 may send a message to DFACS 210, requesting DFACS 210 to approve the deletion of the sub-location address (block 728). If the reply from DFACS 210 indicates that the deletion is not approved by DFACS 210 (block 730—NO), address cleaner 406 may proceed to block 714. Otherwise (block 730—YES), address cleaner 406 may attempt to delete the sub-location address (block 732). Upon a successful completion of the deletion (block 734—YES), address cleaner 406 may include a summary of the deletion in the report (block 738), and return to block 712 to process additional sub-location addresses.

If the sub-location address is not successfully deleted (block 734—NO), address cleaner 406 may rollback the move-and-delete transaction, and proceed to block 714.

Figure 8:
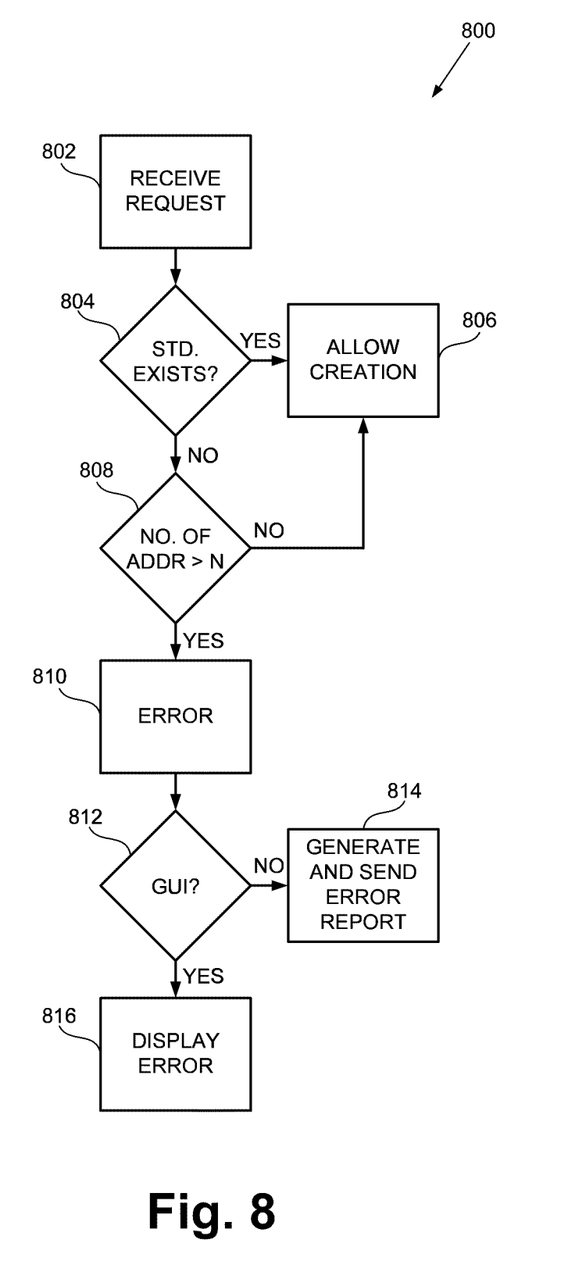
FIG. 8 is a flow diagram of an exemplary process for enforcing sub-location address standards.

FIG. 8 is a flow diagram of an exemplary process 800 for enforcing sub-location address standards. Process 800 may start when address cleaner 406 receives a request to create a sub-location address (block 802). Upon receipt of the request, address cleaner 406 may determine whether a standard (e.g., a format) for the sub-location address already exists (block 804). For example, address cleaner 406 may determine whether there is a format (e.g., what supplemental address is allowed, what alphanumeric characters can be used for forming a supplemental address, etc.) for the sub-location address that is being requested to be created. If so, address cleaner 406 may allow the creation of the sub-location address in accordance with the existing standard (block 806).

If there is no standard (block 804—NO), address cleaner 406 may determine whether the number of sub-location addresses that are to be created exceeds a threshold N (e.g., 10) (block 808). If the number of sub-location addresses does not exceed threshold N (block 808—NO), address cleaner 406 may proceed to block 806. Otherwise, (block 808—YES), address cleaner 406 may generate an error (block 810).

If the attempted creation of the sub-location address was via a GUI (e.g., browser) (block 812 YES), address cleaner 406 may notify an operator at the GUI (block 816). Otherwise, address cleaner 406 may determine that creating the sub-location address was initiated through another program, such as a program for auto-creating an address based on an order (e.g., ordering a particular telephone number). In such an instance, address cleaner 406 may generate and send a report including a description of the error.

Figure 9:
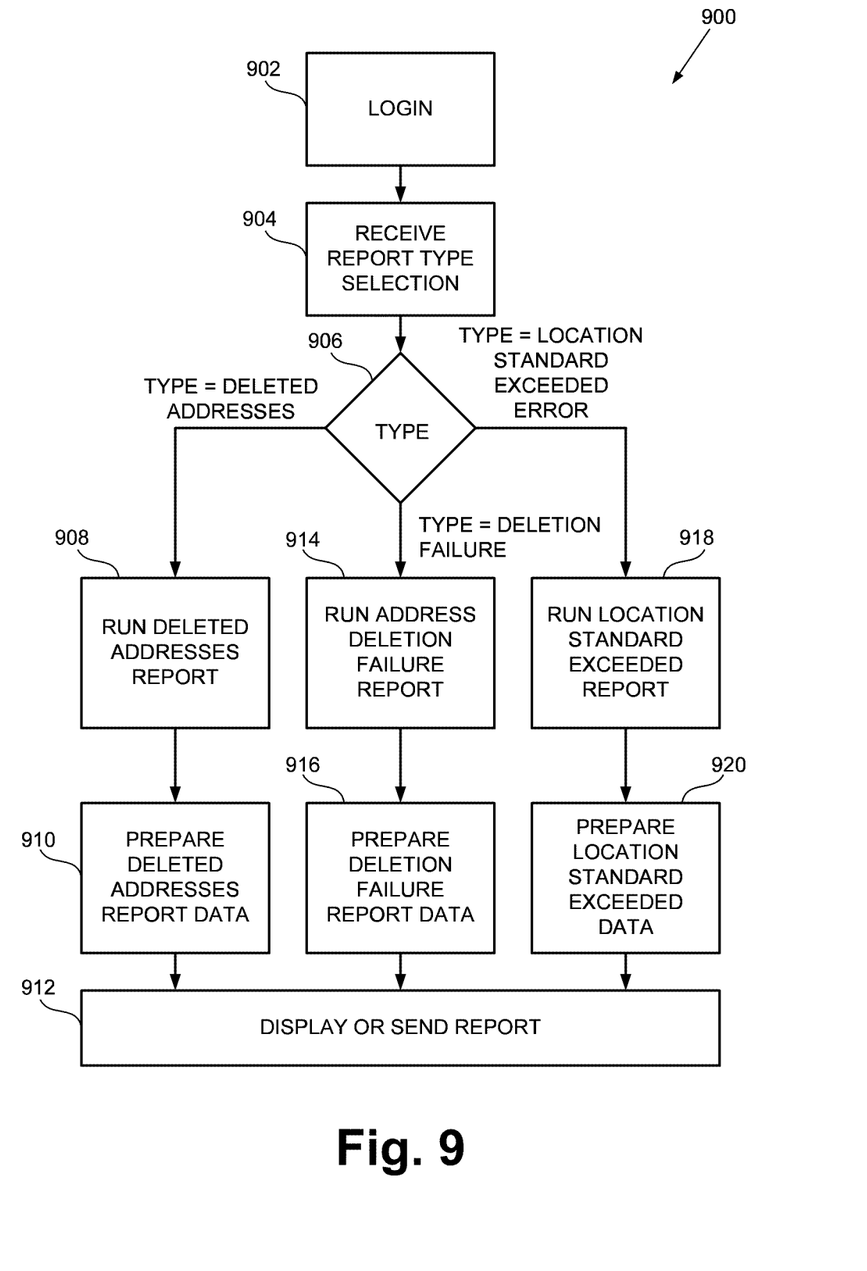
FIG. 9 is a flow diagram of an exemplary process for generating reports.

FIG. 9 is a flow diagram of an exemplary process 900 for generating reports. Process 900 may begin with an operator logging into address cleaner 406, with appropriate privileges to generate a report and forward the report to a network destination (e.g., an email address, network address, etc.) associated with the program for auto-creating addresses (block 902)

For example, in one implementation, the operator may login with a system permission to view/run reports on sub-location addresses, including error reports, reports on deleted addresses, and reports on system/user attempts to generate addresses that do not conform to established standards. Thereafter, the operator may view or run the reports.

At block 904, address cleaner 406 may receive, from an operator via a client application, a selection of a report type (block 904). If the selected type is "DELETED ADDRESSES" (block 906, TYPE=DELETED ADDRESSES), address cleaner 406 may run a deleted address report (block 908). In running the deleted address report, address cleaner 406 may prepare and include deleted address data in the report (e.g., a list of deleted addresses, the time of deletion, etc.) (block 910). At block 912, address cleaner 406 may display or send the report to the operator (e.g., email the report).

Returning to block 906, if the selected type is "DELETION FAILURE" (block 906, TYPE=DELETION FAILURE), address cleaner 406 may run an address deletion failure report (block 914). Address cleaner 406 may prepare and include, in the report, data relevant to failed deletions, such as a list of sub-location addresses not deleted from address database 402, the reasons for the failures, etc. (block 916). Address cleaner 406 may display and/or send the report to the operator (block 912).

Returning to block 906, if the selected type is "LOCATION STANDARD EXCEEDED" (block 906, TYPE=LOCATION STANDARD EXCEEDED), address cleaner 406 may run a report on occurrences of operator attempts to create a sub-location address that does not conform to an existing format or standard (block 918). Address cleaner 406 may prepare and include, in the report, descriptions of the occurrences of failed attempts to create non-standard sub-location addresses (block 920). Address cleaner 406 may also run a report to find addresses that do not have standards defined or addresses that do not conform to an existing standard. Thereafter, address cleaner 406 may display and/or send the report to the operator (block 912).

Figure 10:
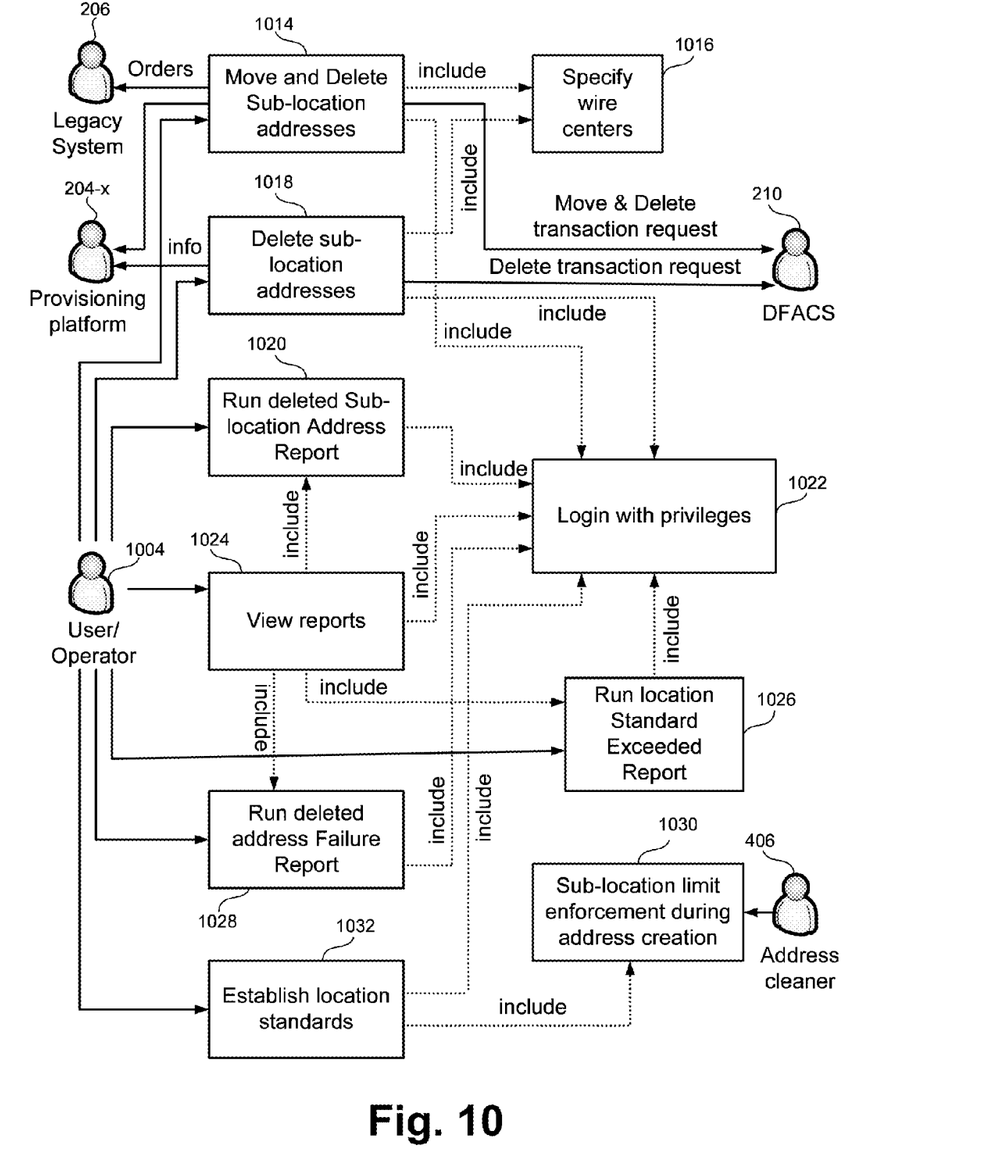
FIG. 10 is a diagram illustrating interaction between different components of the network illustrated in FIG. 2.

FIG. 10 is a diagram illustrating interaction between different components of network 200 and an operator/user 1004. As shown, moving and deleting sub-location addresses 1014 may affect orders that are received at legacy system 206 and provisioning platform 204-*x*. As also shown, moving and deleting sub-location addresses 1014 may entail specifying wire centers 1016, and submitting, to DFACS 210, a request to approve a move and delete transaction. Moving and deleting sub-location addresses 1014 may result in moving an account from a sub-location address to the basic address that corresponds to the sub-location address (e.g., for example, FIG. 1), and then, deleting the sub-location address. Moving and deleting sub-location addresses 1014 may require an operator to login at address cleaner 406 with proper privileges 1022.

Deleting sub-location addresses 1018 may affect operations at provisioning platform 204-*x*. In addition, deleting sub-location addresses 1014 may entail specifying wire centers 1016 and submitting to DFACS 210 a request to approve a delete transaction. Deleting sub-location addresses may require the operator to login at address cleaner 406 with proper privileges 1022.

A user or an operator may move and delete sub-location address 1014, delete sub-location addresses 1018, run deleted sub-location address report 1020, view reports 1024, run location standard exceeded report 1026, run deleted address failure report 1028, and establish location standards 1032. All of these may require the user/operator 1004 to login with appropriate privileges 1022.

Viewing reports 1024 may entail generating reports, and therefore, may also include running deleted sub-location address report 1020, running location standard exceeded report 1026, and running deleted address failure report 1028.

Establishing location standard 1032 may result in sub-location limit enforcement during address creation 1030 at address system 208 (e.g., limiting the number of sub-location addresses that can be created in a specific format).

In the above description, a system may identify and correct address discrepancies. Within address database 402, sub-location addresses that designate the same location may lead to an address discrepancy, errors and inefficiencies in processing user accounts that are associated with the addresses. In such instances, address cleaner 406 may identify and remove redundant or inconsistent sub-location addresses. In addition, address cleaner 406 may aid in preventing future inconsistencies or discrepancies by enforcing sub-location address creation standards.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of acts/blocks have been described with one or more flow diagrams, the order of acts/blocks may be varied in other implementations. Moreover, non-dependent acts/blocks may be implemented in parallel. In addition, while two types of addresses (e.g., basic address and sub-location address) have been discussed above, in other implementations, other types of addresses may be reconciled (e.g., a basic address and an address that includes additional, less, or different information (e.g., an address without a zip code, etc.).

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a memory including an address database for storing sub-location addresses; and
    a processor configured to:
        receive, from a network device, a request to perform address reconciliation of the sub-location addresses that correspond to physical addresses associated with physical devices related to different central offices;
        retrieve the sub-location addresses from the database based on the request;
        determine, for each of the sub-location addresses, whether the sub-location address is to be deleted from the database by determining whether a physical device assigned to the sub-location address can be reassigned to the corresponding physical address; and
        delete one or more of the sub-location addresses from the database based on the determinations.

2. The device of claim 1, wherein each of the one or more of the sub-location addresses includes a supplemental address that designates an area within the one or more of the sub-location addresses.

3. The device of claim 1, wherein when determining, the processor is further configured to:
    for each of the sub-location addresses, when the sub-location address has an account history, reassign a user account associated with the sub-location address to the corresponding physical address.

4. The device of claim 1, wherein the processor, when determining whether the sub-location address is to be deleted from the database, is configured to:
send a message to an external database that tracks whether the physical device is currently associated with the sub-location address, the message requesting the external database to allow or deny a deletion of the sub-location address from the database.

5. The device of claim 4, wherein the processor is further configured to:
perform a rollback when the external database denies the deletion of the sub-location address.

6. The device of claim 4, wherein the processor is further configured to:
include, in a report, a list of sub-location addresses for which the external database denies deletion.

7. The device of claim 1, wherein the processor is further configured to provide an operator with appropriate privileges for deleting sub-location addresses or generating a report when the operator logs into the device.

8. The device of claim 1, wherein the processor is further configured to generate at least one of:
a deleted address report;
an address deletion failure report; or
a location standard exceeded report.

9. The device of claim 1, wherein the processor is further configured to enforce a sub-location address creation standard.

10. The device of claim 9, wherein the processor is further configured to:
allow creation of at least one sub-location address but less than a threshold number of sub-location addresses for which there is no predefined standard; and
generate an error responsive to an attempt to create a sub-location address in excess of threshold number of sub-location addresses for which there is no predefined standard.

11. The device of claim 1, wherein the processor is further configured to:
receive, from a user, a format for creating sub-location address in the database.

12. The device of claim 1, wherein the processor is further configured to:
receive a list identifying the different central offices,
schedule address reconciliation activity for each of the central offices at a corresponding time,
wherein the processor determines, for each one of the central offices at the scheduled time, for each of the sub-location addresses that correspond to the central office, whether the sub-location address is to be deleted from the database by determining whether a physical device assigned to the sub-location address can be reassigned to the corresponding physical address, and
wherein each of the central offices includes a location at which telephone lines associated with addresses or user accounts are switched.

13. The device of claim 12, wherein the processor is further configured to limit a number of scheduled central offices for which the address reconciliation is to be performed per unit time.

14. The device of claim 1, wherein the request includes one of:
a request to delete the stored sub-location addresses; or
a request to reassign user accounts associated with the stored sub-location addresses to the corresponding physical addresses and delete the stored sub-location addresses.

15. A method comprising:
receiving, from a network device, a request to reconcile physical addresses associated with telephone lines related to different central offices;
obtaining sub-location addresses, from a database associating the telephone lines with the physical addresses, based on a number of the different central offices identified in the request;
determining, for each of the sub-location addresses, whether the sub-location address is to be deleted from the database by determining whether a telephone line is assigned to the sub-location address or can be reassigned to another address;
deleting at least some of the sub-location addresses based on the determinations; and
generating a report identifying the deleted sub-location addresses.

16. The method of claim 15, wherein the determining includes:
determining whether a sub-location address has an account history.

17. The method of claim 15, further comprising:
receiving a list of the number of the different central offices for reconciling the physical addresses.

18. The method of claim 15, further comprising:
displaying an error when the number of the different central offices exceeds a threshold.

19. A non-transitory computer-readable medium comprising computer-executable instructions for causing a processing device to:
receive a list of central offices for address reconciliation;
obtain sub-location addresses from a first database based on the list of central offices;
send a query describing a first one of the sub-location addresses to a second database that tracks whether a telephone line assigned to the first sub-location address can be reassigned to a physical address corresponding to the first sub-location address;
receive a reply from the second database indicating that the telephone line can be reassigned to the physical address;
determine that the first sub-location address can be deleted from the first database based on the reply;
reassign the telephone line from the first sub-location address to the physical address;
delete the first sub-location address; and
generate a report that includes the first sub-location address.

* * * * *